United States Patent
Kurokawa (10) Patent No.: US 9,503,608 B2
(45) Date of Patent: Nov. 22, 2016

(54) EQUIPMENT MANAGEMENT SYSTEM, EQUIPMENT MANAGEMENT DEVICE, AND EQUIPMENT

(71) Applicant: Kaname Kurokawa, Chiba (JP)

(72) Inventor: Kaname Kurokawa, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/817,381

(22) Filed: Aug. 4, 2015

(65) Prior Publication Data
US 2016/0044205 A1 Feb. 11, 2016

(30) Foreign Application Priority Data
Aug. 8, 2014 (JP) ................................. 2014-162325

(51) Int. Cl.
H04N 1/32 (2006.01)
H04N 1/00 (2006.01)

(52) U.S. Cl.
CPC ........ *H04N 1/3255* (2013.01); *H04N 1/00244* (2013.01); *H04N 1/00344* (2013.01); *H04N 1/00957* (2013.01); *H04N 1/32106* (2013.01); *H04N 1/32539* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 8,990,043 B1 * | 3/2015 | Kolodziej | ................ | G01C 5/06 455/404.2 |
| 9,053,588 B1 * | 6/2015 | Briggs | ................... | G07C 5/006 |
| 2002/0198003 A1 * | 12/2002 | Klapman | ................ | H04W 4/02 455/456.1 |
| 2003/0097427 A1 * | 5/2003 | Parry | ...................... | H04L 29/06 709/220 |
| 2011/0106837 A1 * | 5/2011 | Walton | .................. | H04W 48/16 707/769 |
| 2012/0078959 A1 * | 3/2012 | Cho | ........................ | G05B 15/02 707/770 |
| 2012/0208563 A1 * | 8/2012 | Yoon | ................... | G06F 17/3087 455/456.3 |
| 2015/0379441 A1 * | 12/2015 | Syed | .................. | G06Q 10/0631 705/2 |
| 2016/0005003 A1 * | 1/2016 | Norris | .................... | G06Q 10/10 705/7.19 |

FOREIGN PATENT DOCUMENTS

JP 2009-193178 8/2009

* cited by examiner

*Primary Examiner* — Jerome Grant, II
(74) *Attorney, Agent, or Firm* — Oblon, McClelland, Maier & Neustadt, L.L.P.

(57) ABSTRACT

There are included: a processing-result-information-acquiring-unit that acquires, from each equipment, processing result information associating communication device identification information for identifying a communication device being installed corresponding to the equipment and processing request information regarding a processing request; a layout-information-acquiring-unit that acquires layout information associating, with each piece of the communication device identification information, area information indicating an area where the communication device indicated by the communication device identification information is installed; a proposal-information-acquiring-unit that acquires proposal information associating, for each type of area, a proposal condition and a proposed content; a determining-unit that determines, for each area, whether the proposal condition is satisfied or not, based on a plurality of pieces of the processing result information, the layout information, and the proposal information; and an output-control-unit that causes, when the proposal condition is satisfied, an output unit to output a proposed content associated with the proposal condition.

10 Claims, 10 Drawing Sheets

| COMMUNICATION DEVICE IDENTIFICATION INFORMATION | AREA INFORMATION | | | COORDINATE INFORMATION |
|---|---|---|---|---|
| | LEVEL 1 | LEVEL 2 | LEVEL 3 | |
| 20-1 | FLOOR A | DEPARTMENT A | DESK A1 | (10, 10) |
| ⋮ | ⋮ | ⋮ | ⋮ | ⋮ |
| 20-n | FLOOR B | DEPARTMENT C | DESK C1 | (80, 80) |
| 40-1 | FLOOR A | – | – | (60, 60) |
| ⋮ | ⋮ | ⋮ | ⋮ | ⋮ |
| 40-m | FLOOR B | DEPARTMENT C | DESK C3 | (80, 95) |
| 50-1 | FLOOR A | – | – | (90, 15) |
| ⋮ | ⋮ | ⋮ | ⋮ | ⋮ |
| 50-l | CORRIDOR | – | – | (95, 65) |

FIG.8

| TYPE OF AREA | TYPE OF PROCESSING | PROPOSAL CONDITION | PROPOSED CONTENT |
|---|---|---|---|
| DEPARTMENT | PRINT | THE NUMBER OF TIMES OF PRINTING BASED ON PROCESSING REQUEST FROM AREA IS 5000 OR MORE/MONTH | PURCHASE MFP. |
| DESK | PRINT | THE NUMBER OF TIMES OF PRINTING BASED ON PROCESSING REQUEST FROM AREA IS 2000 OR MORE/MONTH | PURCHASE PRINTER. |
| CONFERENCE ROOM | PRINT | THE NUMBER OF TIMES OF PRINTING BASED ON PROCESSING REQUEST FROM AREA IS 2000 OR MORE/MONTH | PURCHASE PRINTER. |
| FLOOR | PRINT/COPY | COUNTER VALUE BASED ON PROCESSING PERFORMED IN AREA IS LESS THAN 200/MONTH, TWO OR MORE IMAGE FORMING DEVICES ARE PRESENT | REDUCE IMAGE FORMING APPARATUSES TO ONE. |
| FLOOR | PRINT | PRINTING ACROSS TRAFFIC LINE (5, 65) – (95, 65) | NO PRINTING ACROSS TRAFFIC LINE. |
| ... | ... | ... | ... |

FIG.9

| No | PROCESSING TYPE INFORMATION | DEPARTMENT IDENTIFICATION INFORMATION | USER IDENTIFICATION INFORMATION | COMMUNICATION DEVICE IDENTIFICATION INFORMATION (REQUEST SOURCE) | COMMUNICATION DEVICE IDENTIFICATION INFORMATION (REQUEST DESTINATION) | PROCESSING TIMES INFORMATION |
|---|---|---|---|---|---|---|
| 1 | PRINT | DEPARTMENT A | AAA | 20-1 | 40-1 | 10 |
| 2 | PRINT | DEPARTMENT A | BBB | 20-2 | 40-2 | 5 |
| 3 | COPY | - | AAA | - | 40-1 | 20 |
| 4 | PRINT | DEPARTMENT A | BBB | 50-1 | 40-1 | 30 |
| 5 | PRINT | DEPARTMENT C | GGG | 20-7 | 40-2 | 10 |
| ... | ... | ... | ... | ... | ... | ... |

EQUIPMENT MANAGEMENT SYSTEM, EQUIPMENT MANAGEMENT DEVICE, AND EQUIPMENT

CROSS-REFERENCE TO RELATED APPLICATIONS

The present application claims priority to and incorporates by reference the entire contents of Japanese Patent Application No. 2014-162325 filed in Japan on Aug. 8, 2014.

BACKGROUND OF THE INVENTION

1. Field of the Invention

The present invention relates to an equipment management system, an equipment management device, and an equipment.

2. Description of the Related Art

Conventionally, there is known a technique of sorting a plurality of printing devices into groups, and proposing an optimal layout of the printing devices for each group based on the printing statuses of the printing devices (for example, see Japanese Laid-open Patent Publication No. 2009-193178).

However, a conventional technique as described above may only make a stereotypical proposal because optimization is performed for all the groups under the same condition.

SUMMARY OF THE INVENTION

It is an object of the present invention to at least partially solve the problems in the conventional technology.

According to the present invention, there is provided an equipment management system comprising: a plurality of equipments; communication devices correspondingly and respectively installed for the equipments; and an equipment management device that manages the plurality of equipments, wherein each of the plurality of communication devices includes a storage unit that stores communication device identification information for identifying the communication device, wherein each of the plurality of equipments includes a communication device identification information acquiring unit that acquires the communication device identification information from the communication device that is correspondingly installed, a reception unit that receives a processing request, a processor that performs processing based on the processing request, and a generating unit that generates processing result information associating the communication device identification information acquired and processing request information regarding the processing request, and wherein the equipment management device includes a processing result information acquiring unit that acquires the processing result information from each of the plurality of equipments, a layout information acquiring unit that acquires layout information associating, with each piece of the communication device identification information, area information indicating an area where the communication device indicated by the communication device identification information is installed, a proposal information acquiring unit that acquires proposal information associating, for each type of area, a proposal condition and a proposed content, a determining unit that determines, for each area, whether the proposal condition is satisfied or not, based on the plurality of pieces of processing result information, the layout information, and the proposal information, and an output control unit that causes, in a case where the proposal condition is satisfied in at least one area, an output unit to output, as a proposed content for the area, a proposal that is based on the proposed content associated with the proposal condition.

The present invention also provides an equipment management device that manages a plurality of equipments, the device comprising: a processing result information acquiring unit that acquires, from each of the plurality of equipments, processing result information associating communication device identification information for identifying a communication device that is installed corresponding to the equipment and processing request information regarding a processing request; a layout information acquiring unit that acquires layout information associating, with each piece of the communication device identification information, area information indicating an area where the communication device indicated by the communication device identification information is installed; a proposal information acquiring unit that acquires proposal information associating, for each type of area, a proposal condition and a proposed content; a determining unit that determines, for each area, whether or not the proposal condition is satisfied, based on the plurality of pieces of processing result information, the layout information, and the proposal information; and an output control unit that causes, in a case where the proposal condition is satisfied in at least one area, an output unit to output, as a proposed content for the area, a proposal that is based on the proposed content associated with the proposal condition.

The present invention also provides an equipment comprising: a communication device identification information acquiring unit that acquires, from a communication device that is correspondingly installed, communication device identification information for identifying the communication device; a reception unit that receives a processing request; a processor that performs processing based on the processing request; and a generating unit that generates processing result information associating the communication device identification information acquired and processing request information regarding the processing request.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an equipment management system, an equipment management device, and an equipment according to the present invention will be described in detail with reference to the attached drawings.

Figure 1:
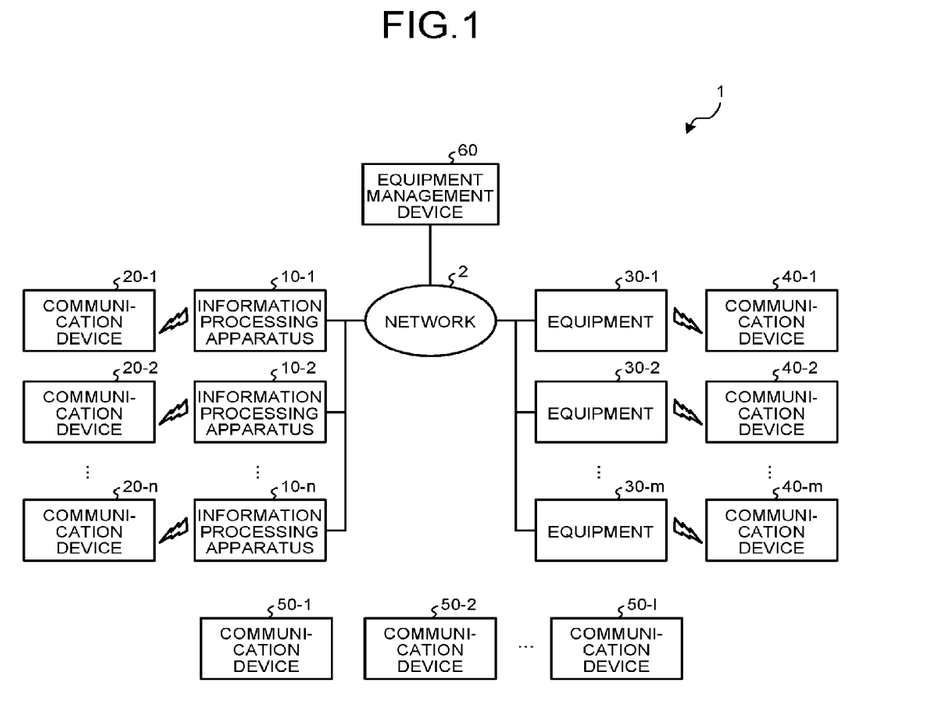
FIG. 1 is a block diagram illustrating an example configuration of an equipment management system of a present embodiment of the present invention.

FIG. 1 is a block diagram illustrating an example configuration of an equipment management system 1 of the present embodiment. As illustrated in FIG. 1, the equipment management system 1 includes information processing apparatuses 10-1 to 10-$n$ (n≥2), communication devices 20-1 to 20-$n$, equipments 30-1 to 30-$m$ (m≥2), communication devices 40-1 to 40-$m$, communication devices 50-1 to 50-1 (1≥2), and an equipment management device 60.

The information processing apparatuses 10-1 to 10-$n$, the equipments 30-1 to 30-$m$, and the equipment management device 60 are connected via a network 2. The network 2 may be realized by the Internet or a LAN (Local Area Network), for example.

Additionally, in the following description, in the case where the information processing apparatuses 10-1 to 10-$n$ do not have to be distinguished from one another, they may simply be referred to as the information processing apparatus(es) 10, and in the case where the communication devices 20-1 to 20-$n$ do not have to be distinguished from one another, they may simply be referred to as the communication device(s) 20, and in the case where the equipments 30-1 to 30-$m$ do not have to be distinguished from one another, they may simply be referred to as the equipment(s) 30, and in the case the communication devices 40-1 to 40-$m$ do not have to be distinguished from one another, they may simply be referred to as the communication device(s) 40, and in the case where the communication devices 50-1 to 50-1 do not have to be distinguished from one another, they may simply be referred to as the communication device(s) 50.

As the information processing apparatus 10, those that issue a processing request to the equipment 30, such as a desktop PC (Personal Computer), a notebook PC (Personal Computer), a smartphone and a tablet terminal, may be cited.

As the equipment 30, image forming devices, such as a printing device, a copier, a multifunction peripheral, a scanner device and a facsimile device, and various electronic equipments, such as a projector, a camera, an air conditioner, a refrigerator, a fluorescent light, a vending machine and a handheld terminal, may be cited. In the present embodiment, a case where the equipment 30 is an image forming device is described as an example, but this is not restrictive.

As the communication device 20, the communication device 40 and the communication device 50, an RFID (Radio Frequency IDentification), a GPS (Global Positioning System) receiver and the like may be cited. In the present embodiment, a case where the communication device 20, the communication device 40 and the communication device 50 are RFIDs is described as an example, but this is not restrictive.

The equipment management device 60 is for managing the equipment 30, and a computer or the like may be cited as the same, for example.

Figure 2:
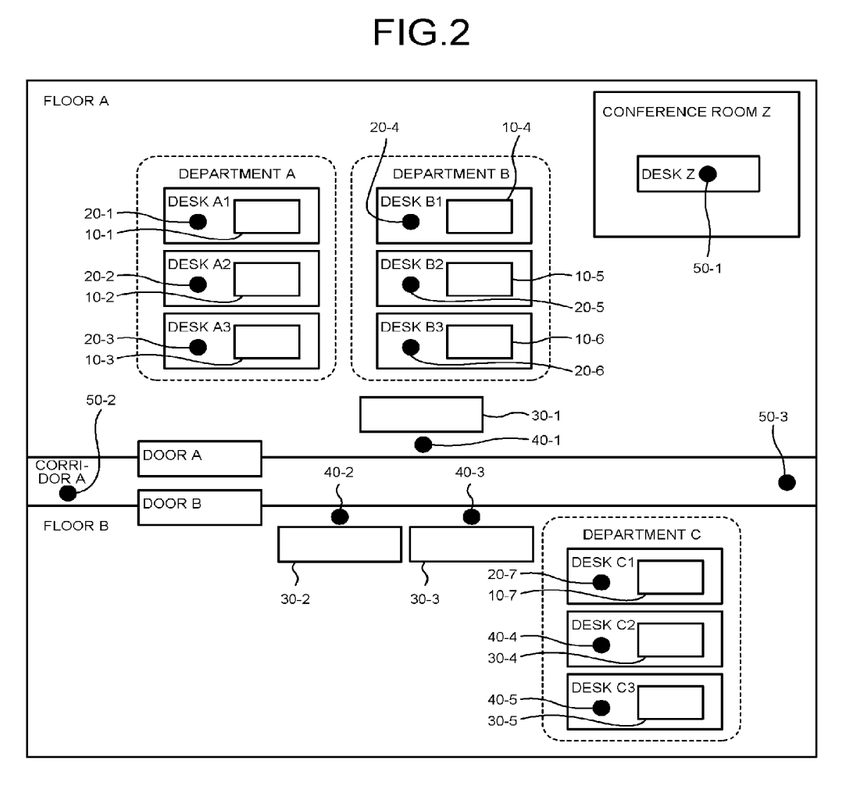
FIG. 2 is a layout diagram illustrating an example of an office where the equipment management system of the present embodiment is applied.

FIG. 2 is a layout diagram illustrating an example of an office where the equipment management system 1 of the present embodiment is applied. The office illustrated in FIG. 2 includes a floor A, a corridor A, and a floor B, and the floor A includes a department A, a department B, and a conference room Z, the floor B includes a department C, a door A is installed at a boundary between the floor A and the corridor A, and a door B is installed at a boundary between the floor B and the corridor A.

The equipment 30-1 and the communication device 40-1 are installed corresponding to each other on the floor A.

Desks A1 to A3 are installed in the department A, and the information processing apparatus 10-1 and the communication device 20-1 are installed corresponding to each other at the desk A1, the information processing apparatus 10-2 and the communication device 20-2 are installed corresponding to each other at the desk A2, and the information processing apparatus 10-3 and the communication device 20-3 are installed corresponding to each other at the desk A3.

Desks B1 to B3 are installed in the department B, and the information processing apparatus 10-4 and the communication device 20-4 are installed corresponding to each other at the desk B1, the information processing apparatus 10-5 and the communication device 20-5 are installed corresponding to each other at the desk B2, and the information processing apparatus 10-6 and the communication device 20-6 are installed corresponding to each other at the desk B3.

A desk Z is installed in the conference room Z, and the communication device 50-1 is installed at the desk Z.

The communication devices 50-2 and 50-3 are installed in the corridor A. Additionally, since the corridor A is a traffic line which many people use, the communication devices 50-2 and 50-3 are installed corresponding to the traffic line. That is, the communication devices 50-2 and 50-3 are installed corresponding to a predetermined traffic line. Moreover, the number of communication devices 50 to be installed corresponding to the traffic line may be three or more.

On the floor B, the equipment 30-2 and the communication device 40-2 are installed corresponding to each other, and the equipment 30-3 and the communication device 40-3 are installed corresponding to each other.

Desks C1 to C3 are installed in the department C, and the information processing apparatus 10-7 and the communication device 20-7 are installed corresponding to each other at the desk C1, the equipment 30-4 and the communication device 40-4 are installed corresponding to each other at the desk C2, and the equipment 30-5 and the communication device 40-5 are installed corresponding to each other at the desk C3.

Figure 3:
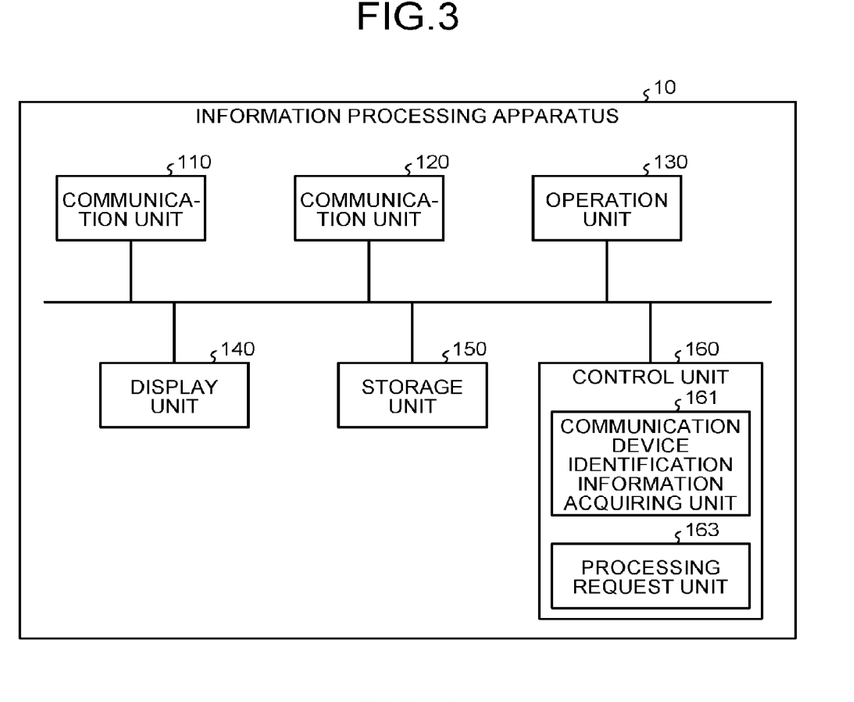
FIG. 3 is a block diagram illustrating an example configuration of an information processing apparatus of the present embodiment.

FIG. 3 is a block diagram illustrating an example configuration of the information processing apparatus 10 of the present embodiment. As illustrated in FIG. 3, the information processing apparatus 10 includes a communication unit 110, a communication unit 120, an operation unit 130, a display unit 140, a storage unit 150, and a control unit 160.

The communication unit 110 is for communicating with the communication device 20, and may be realized by a near field wireless communication device or the like.

The communication unit 120 is for communicating with the equipment management device 60 over the network 2, and may be realized by an NIC (Network Interface Card) or the like.

The operation unit 130 is for inputting various operations, and may be realized by an input device such as a keyboard, a mouse, a touch pad, a touch panel or the like.

The display unit 140 is for displaying various screens, and may be realized by a display device such as a liquid crystal display, a touch panel display or the like.

The storage unit 150 stores various programs to be executed by the information processing apparatus 10, and data to be used in various processes to be performed by the information processing apparatus 10. The storage unit 150 may be realized by at least one of storage devices capable of magnetically, optically, and electrically storing data, such as an HDD (Hard Disk Drive), an SSD (Solid State Drive), a memory card, an optical disk, a ROM (Read Only Memory), and a RAM (Random Access Memory), for example.

The control unit 160 is for controlling each unit of the information processing apparatus 10, and may be realized by a control device such as a CPU (Central Processing Unit), for example. The control unit 160 includes a communication device identification information acquiring unit 161, and a processing request unit 163.

The communication device identification information acquiring unit 161 acquires, from the communication device 20 that is correspondingly installed, communication device identification information for identifying the communication device 20.

The processing request unit 163 issues a processing request to at least one of the equipments 30. A processing request includes processing times information indicating the number of processing times of processing requested by the processing request, and the communication device identification information acquired by the communication device identification information acquiring unit 161, for example.

In the present embodiment, since the equipment 30 is an image forming device, a case where the processing request issued by the processing request unit 163 is a printing processing request is described as an example. In this case, the printing processing request includes image data to be printed, a print command, and the like. Also, the number of times of processing requested by the processing request corresponds to the processing times information. Here, one processing is assumed to correspond to printing of one page (single side). Accordingly, the processing times information may be expressed by the number of copies (the number of jobs)×the number of pages, for example.

Moreover, the processing request may also include user identification information for identifying a user who has issued the processing request, department identification information for identifying the department to which the user belongs, and the like. The user identification information and the department identification information may be set in advance in the information processing apparatus 10, or may be acquired from a server or the like, not illustrated, at the time of logging in to the information processing apparatus 10.

Figure 4:
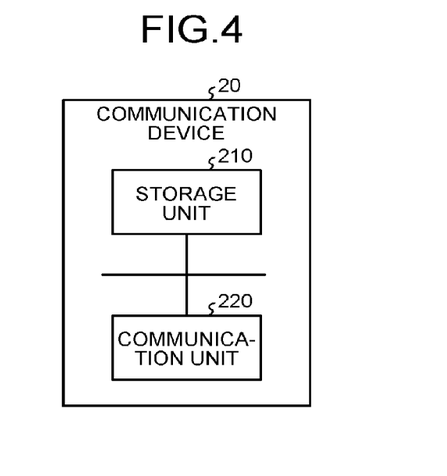
FIG. 4 is a block diagram illustrating an example configuration of a communication device of the present embodiment.

FIG. 4 is a block diagram illustrating an example configuration of the communication device 20 of the present embodiment. As illustrated in FIG. 4, the communication device 20 includes a storage unit 210 and a communication unit 220.

The storage unit 210 stores the communication device identification information of the communication device 20. The storage unit 210 may be realized by a non-volatile memory, for example.

The communication unit 220 may be realized by a near field wireless communication device or the like. When acquisition of the communication device identification information is requested by the information processing apparatus 10 that is correspondingly installed, the communication unit 220 reads the communication device identification information from the storage unit 210, and transmits the same to the information processing apparatus 10.

Additionally, the communication device 40 and the communication device 50 also have the same configuration as the communication device 20.

In the case of the communication device 40, when acquisition of the communication device identification information is requested by the equipment 30 that is correspondingly installed, the communication device 40 reads the communication device identification information from the storage unit 210, and transmits the same to the equipment 30.

Also, in the case of the communication device 50, when acquisition of the communication device identification information is requested, the communication device 50 reads the communication device identification information from the storage unit 210, and transmits the same to the request source. Additionally, in the case of the communication device 50, since the information processing apparatus 10 or the equipment 30 is not correspondingly installed, a mode where a user carries the information processing apparatus 10 to near the communication device 50 and requests for acquisition of the communication device identification information is assumed, but this is not restrictive.

Figure 5:
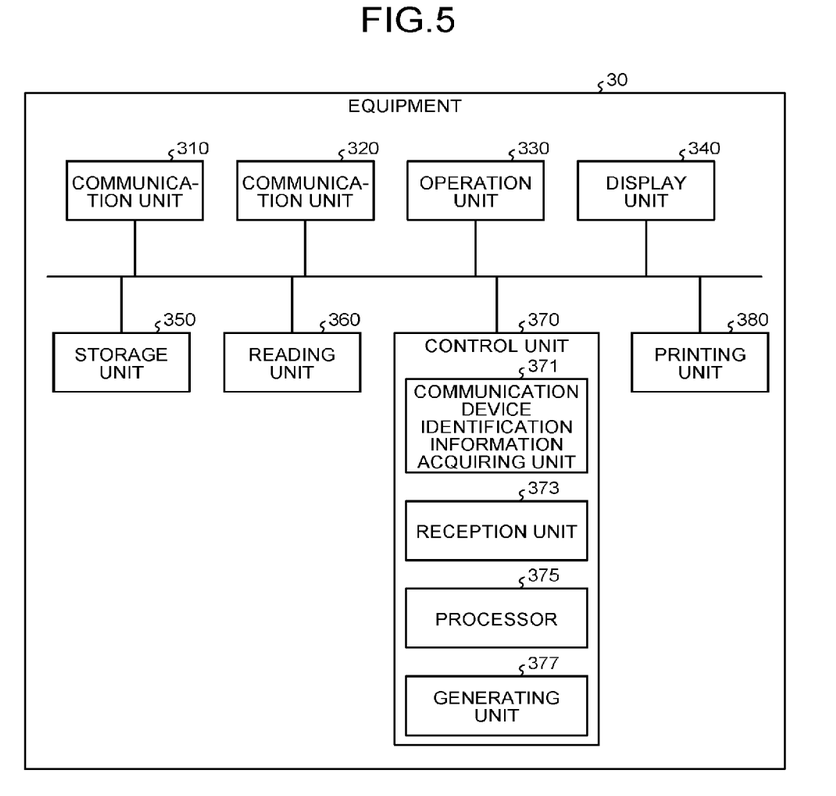
FIG. 5 is a block diagram illustrating an example configuration of an equipment of the present embodiment.

FIG. 5 is a block diagram illustrating an example configuration of the equipment 30 of the present embodiment. As illustrated in FIG. 5, the equipment 30 includes a communication unit 310, a communication unit 320, an operation unit 330, a display unit 340, a storage unit 350, a reading unit 360, a control unit 370, and a printing unit 380.

The communication unit 310 is for communicating with the communication device 40, and may be realized by a near field wireless communication device or the like.

The communication unit 320 is for communicating with the equipment management device 60 over the network 2, and may be realized by an NIC or the like.

The operation unit 330 is for inputting various operations, and may be realized by an input device such as a keyboard, a mouse, a touch pad, a touch panel or the like.

The display unit 340 is for displaying various screens, and may be realized by a display device such as a liquid crystal display, a touch panel display or the like.

The storage unit 350 stores various programs to be executed by the equipment 30, and data to be used in various processes to be performed by the equipment 30. The storage unit 350 may be realized by at least one of storage devices capable of magnetically, optically, and electrically storing data, such as an HDD, an SSD, a memory card, an optical disk, a ROM, and a RAM, for example.

The reading unit 360 is for optically reading a document and generating image data, and may be realized by a scanner, for example.

The control unit 370 is for controlling each unit of the equipment 30, and may be realized by a control device such as a CPU, for example. The control unit 370 includes a communication device identification information acquiring unit 371, a reception unit 373, a processor 375, and a generating unit 377.

The communication device identification information acquiring unit 371 acquires, from the communication device 40 that is correspondingly installed, the communication device identification information for identifying the communication device 40.

The reception unit 373 receives a processing request. Specifically, the reception unit 373 receives a processing request from one of the information processing apparatuses 10, or receives a processing request that is based on an operation input from the operation unit 330. Additionally, the processing request that is based on an operation input from the operation unit 330 includes the processing times information indicating the number of processing times of processing requested by the processing request, but does not include the communication device identification information.

In the present embodiment, a processing request from the information processing apparatus 10 is assumed to be a printing processing request, as described above, and a processing request that is based on an operation input from the operation unit 330 is assumed to be a copying processing request, but these are not restrictive. Additionally, in the case where the reception unit 373 receives a processing request that is based on an operation input from the operation unit 330, the reading unit 360 optically reads the document and generates image data. Also, in the case where the reception unit 373 receives a processing request that is based on an operation input from the operation unit 330, it is assumed that one processing corresponds to copying of one page (single side).

The processor 375 performs processing based on a processing request received by the reception unit 373. Specifically, the processor 375 causes the printing unit 380 to perform one or more times of processing based on the processing request received by the reception unit 373. The printing unit 380 is for printing (forming) an image based on image data on recording paper, and may be realized by a plotter, for example.

For example, in the case of a processing request from the information processing apparatus 10, printing by the number of processing times indicated by the processing times information is performed by causing the printing unit 380 to make a corresponding number of printed copies of an image based on the image data included in the processing request. Also, for example, in the case of a processing request that is based on an operation input from the operation unit 330, copying by the number of processing times indicated by the processing times information is performed by causing the printing unit 380 to make a corresponding number of printed copies of an image based on image data generated by the reading unit 360.

When processing is performed by the processor 375, the generating unit 377 generates processing result information associating the communication device identification information acquired by the communication device identification information acquiring unit 371 and the processing request information regarding the processing request received by the reception unit 373.

In the present embodiment, as the processing request information, the processing times information included in a processing request, processing type information indicating the processing type of processing requested by a processing request, communication device identification information included in a processing request, and the like may be cited.

The processing type information indicates printing in the case of a processing request from the information processing apparatus 10, and indicates copying in the case of a processing request that is based on an operation input from the operation unit 330. The communication device identification information included in a processing request is the communication device identification information that is acquired by the communication device identification information acquiring unit 161 of the information processing apparatus 10, and is included in the processing request information in a case where the processing request is from the information processing apparatus 10.

Additionally, in the case of a processing request from the information processing apparatus 10, the user identification information and the department identification information may be included in the processing type information. Also, if login is necessary to use the equipment 30, the user identification information may be included in the processing type information also in the case of a processing request that is based on an operation input from the operation unit 330.

Figure 6:
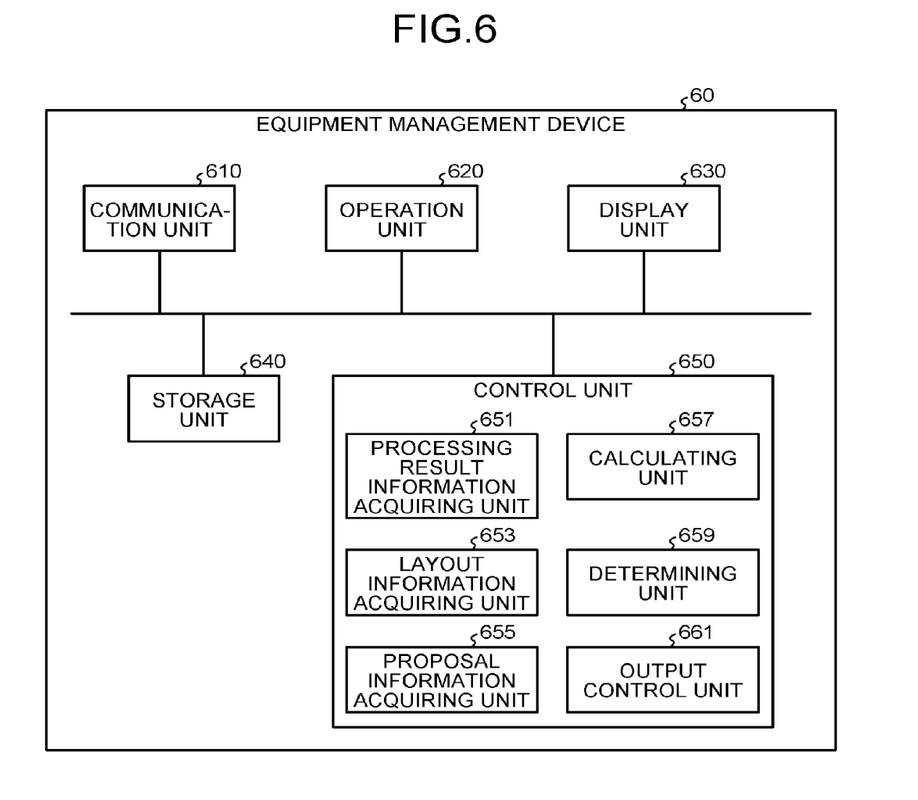
FIG. 6 is a block diagram illustrating an example configuration of an equipment management device of the present embodiment.

FIG. 6 is a block diagram illustrating an example configuration of the equipment management device 60 of the present embodiment. As illustrated in FIG. 6, the equipment management device 60 includes a communication unit 610, an operation unit 620, a display unit 630 (an example of an output unit), a storage unit 640, and a control unit 650.

The communication unit 610 is for communicating with the information processing apparatus 10 and the equipment 30 over the network 2, and may be realized by an NIC or the like.

The operation unit 620 is for inputting various operations, and may be realized by an input device such as a keyboard, a mouse, a touch pad, a touch panel or the like.

The display unit 630 is for displaying various screens, and may be realized by a display device such as a liquid crystal display, a touch panel display or the like.

The storage unit 640 stores various programs to be executed by the equipment management device 60, and data to be used in various processes to be performed by the equipment management device 60. The storage unit 640 may be realized by at least one of storage devices capable of magnetically, optically, and electrically storing data, such as an HDD, an SSD, a memory card, an optical disk, a ROM, and a RAM, for example. In the present embodiment, the storage unit 640 stores layout information and proposal information.

The layout information associates, with each piece of communication device identification information, area information indicating the area where the communication device indicated by the communication device identification information is installed. Additionally, in the present embodiment, the layout information further associates coordinate information indicating the coordinates of the area indicated by the area information. Moreover, in the present embodiment, the area has a hierarchical structure.

Figure 7:
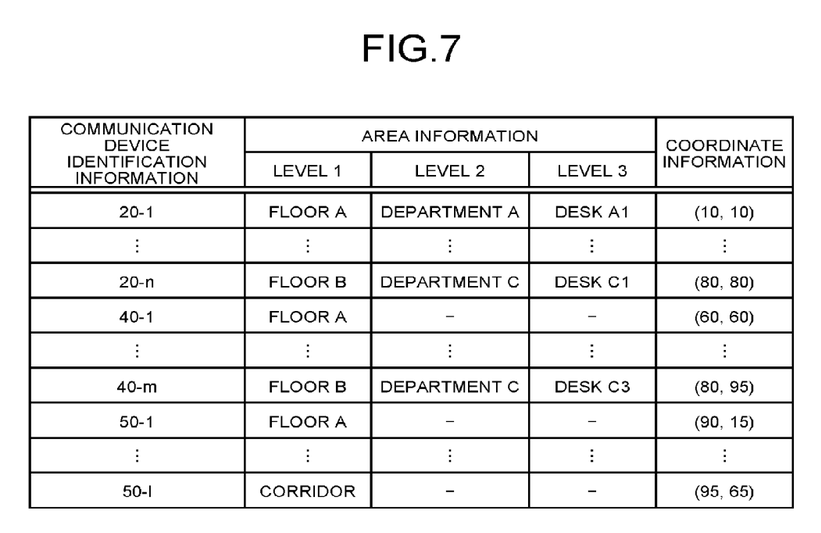
FIG. 7 is a diagram illustrating an example of layout information of the present embodiment.

FIG. 7 is a diagram illustrating an example of the layout information of the present embodiment. In the example illustrated in FIG. 7, the area information and the coordinate information are associated with the communication device identification information of each of the communication devices 20-1 to 20-n, the communication devices 40-1 to 40-m, and the communication devices 50-1 to 50-1.

In the example illustrated in FIG. 7, the areas indicated by the pieces of area information are the floor A, the floor B, the corridor A, the departments A to C, the conference room Z, the desks A1 to A3, the desks B1 to B3, the desks C1 to C3, the desk Z, and the like described with reference to FIG. 2. For example, in the case of communication device identification information "20-1" of the communication device 20-1, since the communication device 20-1 is installed at the desk A1 of the department A on the floor A, the area indicated by the area information is the floor A for a level 1, the department A for a level 2, and the desk A1 for a level 3.

In the example illustrated in FIG. 7, the coordinates indicated by the coordinate information indicate a divided area among 10000 divided areas obtained by dividing the office described with reference to FIG. 2 into 100 areas in each of the x (horizontal) direction and the y (vertical) direction. For example, in the case of the communication device identification information "20-1" of the communication device 20-1, the position of the communication device 20-1 is assumed to be a divided area which is tenth from the left and tenth from the top. In this case, the coordinate information of the communication device identification information "20-1" is (10, 10). Additionally, the top left of the office is the point of origin.

In the present embodiment, the layout information is assumed to be generated semi-automatically, but the generation method may be any method. In the case of the present embodiment, the control unit 650 collects the pieces of communication device identification information of the communication device 20 and the communication device 40 via the information processing apparatus 10 and the equipment 30, and the area information and the coordinate information are manually set (an operation input from the operation unit 620). Also, with respect to the communication device 50, the information processing apparatus 10 is installed near the communication device 50, and the communication device identification information of the communication device 50 is collected via this information processing apparatus 10, and the area information and the coordinate information are manually set (an operation input from the operation unit 620).

The proposal information associates, for each type of area, a proposal condition and a proposed content. Additionally, in the present embodiment, the proposal information further associates the type of processing.

Figure 8:
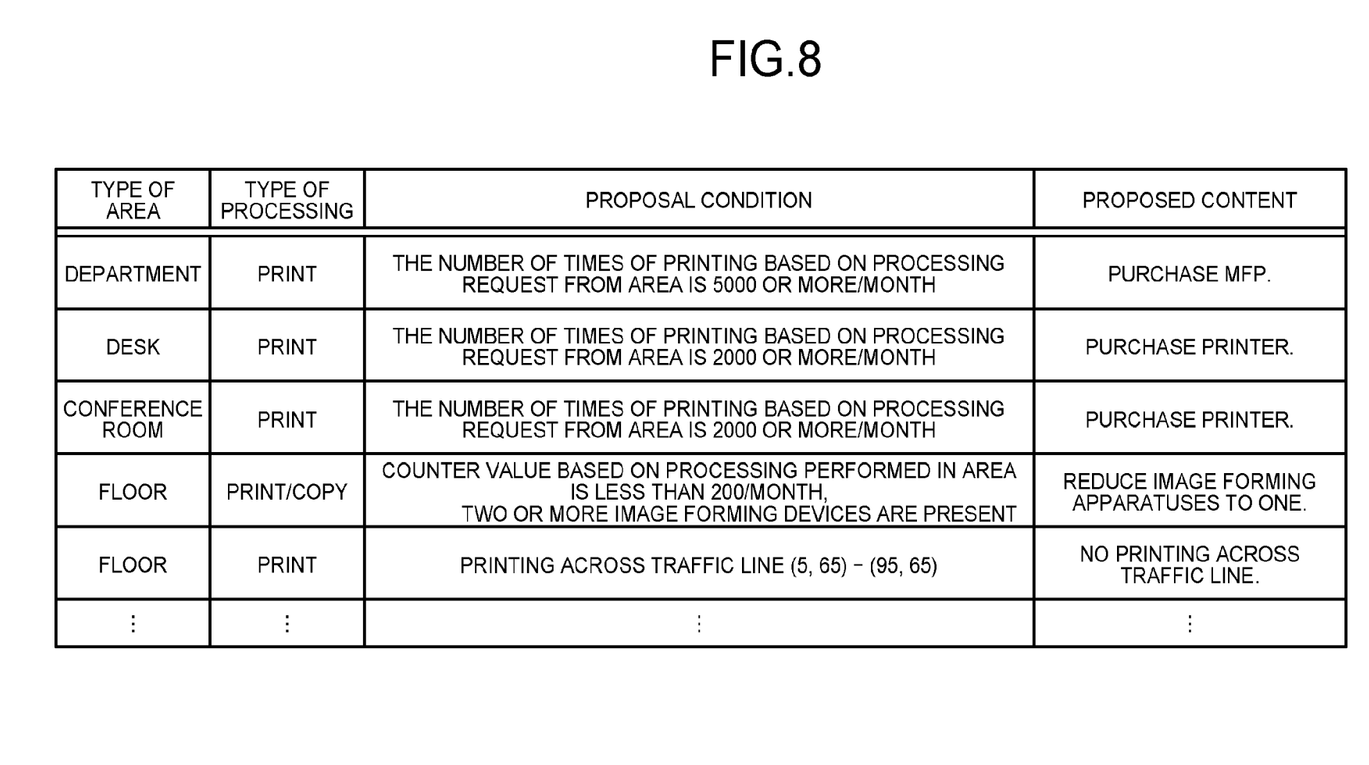
FIG. 8 is a diagram illustrating an example of proposal information of the present embodiment.

FIG. 8 is a diagram illustrating an example of the proposal information of the present embodiment. In the example illustrated in FIG. 8, the type of area is the floor, the corridor, the department, the conference room, the desk or the like described with reference to FIG. 2. In the example illustrated in FIG. 8, the type of processing is at least one of printing and copying. The example illustrated in FIG. 8 includes a proposal condition indicating the upper limit of the number of times of processing per unit period, and the proposed content associated with this proposal condition is additional installation of equipments. The example illustrated in FIG. 8 includes a proposal condition indicating the lower limit of the number of times of processing per unit period, and the proposed content associated with this proposal condition is reduction of equipments. The example illustrated in FIG. 8 includes a proposal condition indicating the coordinates indicated by the coordinate information that is associated with the communication device identification information of each of the communication devices 50-2 and 50-3 installed corresponding to the traffic line, and the proposed content associated with this proposal condition is a warning.

In the present embodiment, the proposal information is assumed to be generated manually (an operation input from the operation unit 620), but the generation method may be any method.

The control unit 650 is for controlling each unit of the equipment management device 60, and may be realized by a control device such as a CPU, for example. The control unit 650 includes a processing result information acquiring unit 651, a layout information acquiring unit 653, a proposal information acquiring unit 655, a calculating unit 657, a determining unit 659, and an output control unit 661.

The processing result information acquiring unit 651 acquires the processing result information from each of a plurality of equipments 30.

Figure 9:
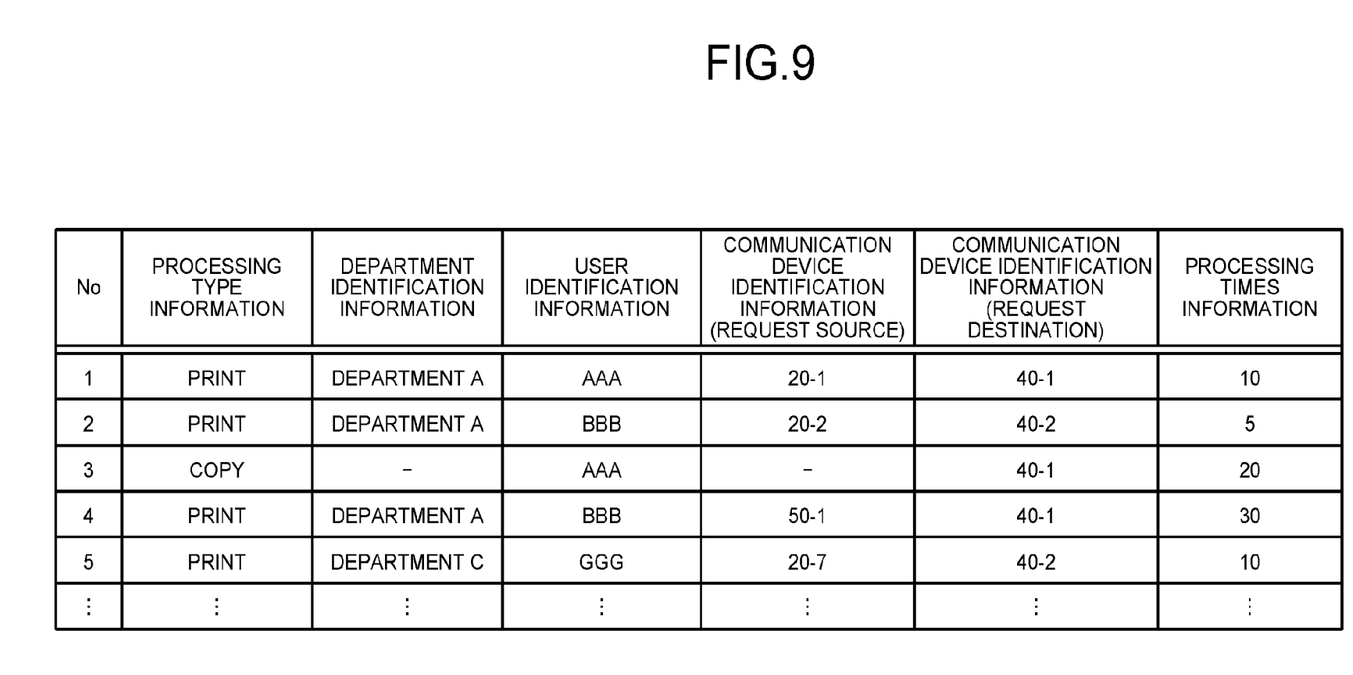
FIG. 9 is a diagram illustrating examples of pieces of processing result information of the present embodiment.

FIG. 9 is a diagram illustrating examples of pieces of processing result information of the present embodiment. In the example illustrated in FIG. 9, the processing result information includes the number, the processing type information, the department identification information, the user identification information, the communication device identification information (request source), the communication device identification information (request destination), and the processing times information. Since the processing result information is already described above, detailed description thereof is omitted. Additionally, the communication device identification information (request source) is the communication device identification information included in a processing request, and is the communication device identification information that is acquired by the communication device identification information acquiring unit 161 of the information processing apparatus 10. The communication device identification information (request destination) is the communication device identification information that is acquired by the communication device identification information acquiring unit 371 of the equipment 30.

The layout information acquiring unit 653 acquires the layout information. In the present embodiment, the layout information acquiring unit 653 acquires the layout information from the storage unit 640.

The proposal information acquiring unit 655 acquires the proposal information. In the present embodiment, the proposal information acquiring unit 655 acquires the proposal information from the storage unit 640.

The calculating unit 657 calculates, for each area, the total number of processing times of processing performed in the area and the total number of processing times of processing that is based on the processing request issued from the area, based on pieces of processing result information acquired by the processing result information acquiring unit 651 and the layout information acquired by the layout information acquiring unit 653. Additionally, in the present embodiment, the calculating unit 657 calculates the total number of times for each area and for each type of processing. In the present embodiment, the types of processing are printing, copying, and printing and copying, and thus the calculating unit 657 may determine, for each area, the total number of times of printing, the total number of times of copying, and the total number of times of printing and copying.

The total number of processing times of processing performed in an area is the total number of processing times of processing performed by all the equipments 30 installed in the area. Accordingly, the calculating unit 657 may refer to the layout information illustrated in FIG. 7, specify, for each area, the communication device identification information associated with the area, and determine, for each type of processing indicated by the processing type information, the total number of processing times indicated by the processing times information in the processing result information, among the pieces of processing result information illustrated in FIG. 9, having this communication device identification information set as the communication device identification information (request destination).

The total number of processing times of processing that is based on a processing request issued from an area is the total number of processing times of processing that is performed based on each processing request from all the information processing apparatuses 10 installed in the area. Accordingly, the calculating unit 657 may refer to the layout information illustrated in FIG. 7, specify, for each area, the communication device identification information associated with the area, and determine, for each type of processing indicated by the processing type information, the total number of processing times indicated by the processing times information in the processing result information, among the pieces of processing result information illustrated in FIG. 9, having this communication device identification information set as the communication device identification information (request source).

The determining unit 659 determines, for each area, whether a proposal condition is satisfied or not, based on the pieces of processing result information acquired by the processing result information acquiring unit 651, the layout information acquired by the layout information acquiring unit 653, and the proposal information acquired by the proposal information acquiring unit 655. Additionally, in the present embodiment, the determining unit 659 determines whether a proposal condition is satisfied or not, for each set of an area and the type of processing.

For example, with respect to an area of a type which is associated with a proposal condition indicating the upper limit of the number of times in the proposal information illustrated in FIG. 8, the determining unit 659 determines whether the total number of times in this area satisfies the upper limit of the number of times or not.

In the proposal information illustrated in FIG. 8, in the case where the type of an area is "department", an upper limit of the number of times "5000 or more/month" is set for the type of processing "printing". Accordingly, the determining unit 659 determines, for the departments A to C whose types of area are "department", whether or not the total numbers of times of printing calculated by the calculating unit 657 satisfy the upper limit of the number of times, "5000 or more/month".

Also, for example, with respect to an area of a type which is associated with a proposal condition indicating the lower limit of the number of times in the proposal information illustrated in FIG. 8, the determining unit 659 determines whether or not the total number of times in this area satisfies the lower limit of the number of times.

In the proposal information illustrated in FIG. 8, in the case where the type of an area is "floor", the lower limit of the number of times "less than 200/month" is set for a type of processing "counter". Additionally, the counter represents printing and copying. Accordingly, the determining unit 659 determines, for the floors A and B whose types of area are "floor", whether or not the total numbers of times of printing and copying calculated by the calculating unit 657 satisfy the lower limit of the number of times, "less than 200/month".

Moreover, in the case where the lower limit of the number of times is satisfied, the determining unit 659 also determines whether two or more equipments 30 are installed or not. Whether two or more equipments 30 are installed in an area or not may be determined from the layout information illustrated in FIG. 7. For example, the communication device identification information associated with an area may be specified, and whether two or more equipments 30 are installed in this area or not may be determined from the content (whether or not it is the communication device identification information of the communication device 40 associated with the equipment 30) of the specified communication device identification information.

Furthermore, for example, with respect to an area of a type which is associated with a proposal condition indicating two or more coordinates in the proposal information illustrated in FIG. 8, the determining unit 659 determines whether or not processing performed in this area was performed in a mode where a straight line connecting the two or more coordinates and a straight line connecting coordinates indicated by the coordinate information associated with each of pieces of communication device identification information included in the processing result information intersect with each other.

In the proposal information illustrated in FIG. 8, in the case where the type of an area is "floor", "traffic line (5, 65)-(95, 65)" is set for the type of processing "printing". Additionally, (5, 65) is the coordinates of the communication device 50-2, and (95, 65) is the coordinates of the communication device 50-3. Accordingly, in the case where the communication device identification information (request destination) included in the processing result information illustrated in FIG. 8 is associated with the floor A or B in the layout information illustrated in FIG. 7, the determining unit 659 refers to the layout information illustrated in FIG. 7, and determines whether or not a straight line connecting the coordinates indicated by the coordinate information associated with the communication device identification information (request source) included in the processing result information and the coordinates indicated by the coordinate information associated with the communication device identification information (request destination) included in the processing result information intersects with the traffic line (5, 65)-(95, 65).

If two coordinates are known, a straight line having the coordinates as end points may be determined, and a straight line based on the communication device identification information (request source) and the communication device identification information (request destination) and the straight line of the traffic line are determined. Moreover, when the coordinates of the intersection point of the straight lines are determined, that printing is performed across the traffic line may be determined.

In the case where a proposal condition is satisfied in at least one of the areas, the output control unit 661 causes the display unit 630 to display, as a proposed content for the area, a proposal that is based on the proposed content associated with the proposal condition.

For example, it is assumed that, as a result of determination by the determining unit 659, it is determined that printing of 5000 or more/month is performed in the department A, and printing of less than 200/month is performed on the floor B, and printing by the equipment 30-2 (communication device identification information "40-2") requested by the information processing apparatus 10-2 (communication device identification information "20-2") is determined to be printing across the traffic line.

In this case, the output control unit 661 causes the display unit 640 to display proposals such as "Purchase MFP for department A", "Reduce image forming apparatuses on floor B to one", and "No printing across traffic line (printing by the equipment 30-2 requested by the information processing apparatus 10-2)", for example.

Figure 10:
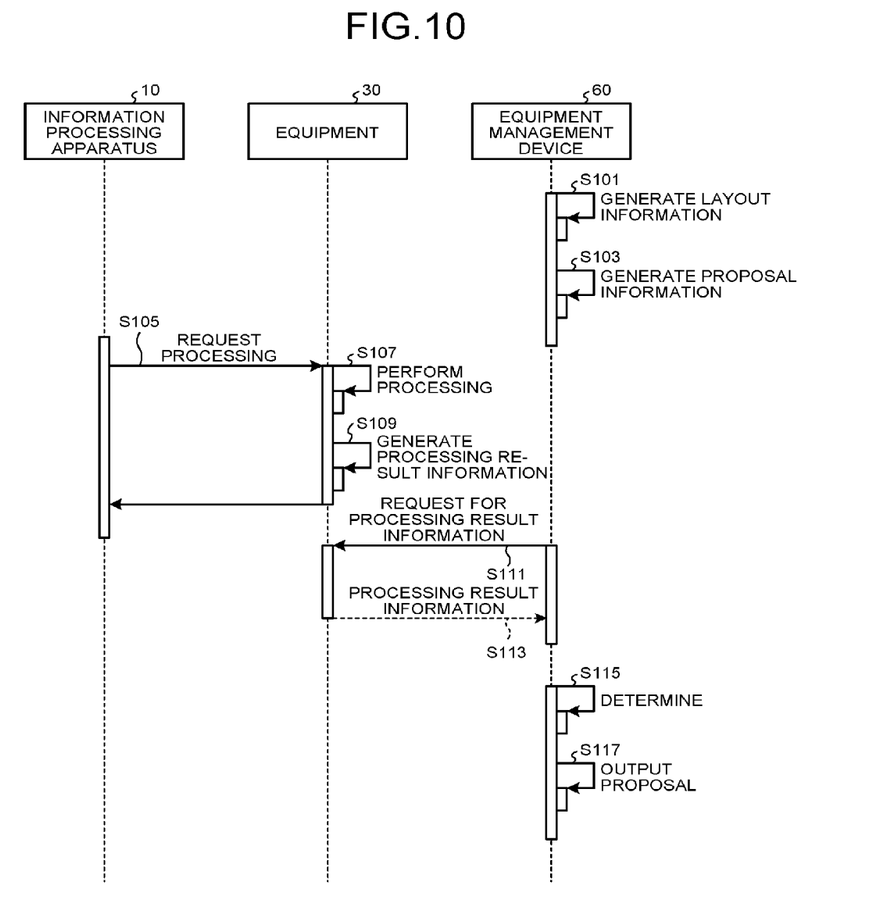
FIG. 10 is a sequence diagram illustrating an example of processing that is performed by the equipment management system of the present embodiment.

FIG. 10 is a sequence diagram illustrating an example of processing that is performed by the equipment management system 1 of the present embodiment.

First, the control unit 650 of the equipment management device 60 collects the communication device identification information of the communication device 20, the communication device 40, and the communication device 50 via the information processing apparatus 10 and the equipment 30, sets the area information and the coordinate information based on operation inputs from the operation unit 620, and thus generates the layout information (step S101).

Next, the control unit 650 generates the proposal information based on an operation input from the operation unit 620 (step S103).

Then, the information processing apparatus 10 acquires, from a correspondingly installed communication device 20, the communication device identification information for identifying the communication device 20, and issues a processing request including the communication device identification information and the processing times information to the equipment 30 (step S105).

Then, the equipment 30 performs processing according to the processing request (step S107), acquires, from a correspondingly installed communication device 40, the communication device identification information for identifying the communication device 40, and generates processing result information associating the communication device identification information and the processing request information regarding the processing request (step S109). Then, the equipment 30 returns to the information processing apparatus 10 a notice to the effect that the processing request has been performed.

Subsequently, the processing result information acquiring unit 651 of the equipment management device 60 requests each of a plurality of equipment 30 for the processing result information (step S111), and acquires a plurality of pieces of processing result information (step S113).

Next, the determining unit 659 of the equipment management device 60 determines, for each area, whether the proposal condition is satisfied or not, based on the plurality of pieces of processing result information, the layout information, and the proposal information (step S115).

Then, in the case where the proposal condition is satisfied in at least one of the areas, the output control unit 661 of the equipment management device 60 causes the display unit 630 to display, as a proposed content for the area, a proposal that is based on the proposed content associated with the proposal condition (step S117).

As described above, according to the present embodiment, since the proposal condition and the proposed content is set for each area, various proposals according to an area where an equipment is installed may be made.

Hardware Configuration

Figure 11:
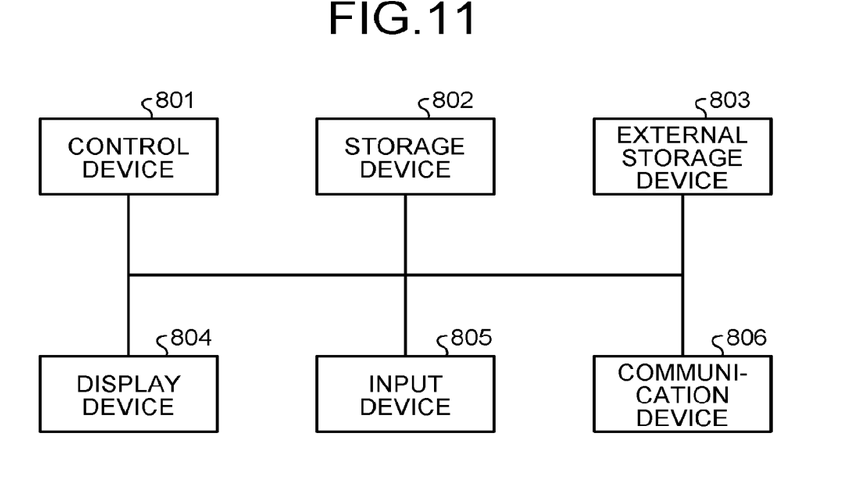
FIG. 11 is a block diagram illustrating an example hardware configuration of each device of the present embodiment.

FIG. 11 is a block diagram illustrating an example hardware configuration of the information processing apparatus 10, the equipment 30, and the equipment management device 60 of the present embodiment (in the following, referred to as "each device of the present embodiment"). Each device of the present embodiment includes a control device 801 such as a CPU, a storage device 802 such as an ROM or a RAM, an external storage device 803 such as an HDD, a display device 804 such as a display, an input device 805 such as a keyboard or a mouse, and a communication device 806 such as a communication interface, and has a hardware configuration where a normal computer is used.

A program to be executed by each device of the present embodiment is provided being stored in a computer-readable storage medium such as a CD-ROM, a CD-R, a memory card, a DVD (Digital Versatile Disk) or a flexible disk (FD) as a file in an installable format or an executable format.

Furthermore, a program to be executed by each device of the present embodiment may be stored in a computer which is connected to a network such as the Internet, and be provided by being downloaded via the network. Moreover, a program to be executed by each device of the present embodiment may be provided or distributed via a network such as the Internet. Moreover, a program to be executed by each device of the present embodiment may be provided being embedded in a ROM or the like in advance.

A program to be executed by each device of the present embodiment has a module structure for realizing each unit described above by a computer. As the actual hardware, a CPU reads a program into a RAM from an HDD and executes the program so as to realize each unit by the computer.

According to the embodiment of the present invention, it is possible to achieve an effect that various proposals according to the area where an equipment is installed may be made.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An equipment management system, comprising:
   a plurality of equipments;
   a plurality of first communication devices correspondingly and respectively installed for the equipments; and
   an equipment management device that manages the plurality of equipments,
   wherein each of the plurality of first communication devices includes a memory that stores communication device identification information for identifying the first communication device, wherein each of the plurality of equipments includes
   first processing circuitry that
      acquires the communication device identification information from the first communication device that is correspondingly installed,
      receives a processing request,
      performs processing based on the processing request, and
      generates processing result information associating the communication device identification information acquired and processing request information regarding the processing request, and
   wherein the equipment management device includes second processing circuitry that
      acquires the processing result information from each of the plurality of equipments,
      acquires layout information associating, with each piece of the communication device identification information, area information indicating an area where the first communication device indicated by the communication device identification information is installed,
      acquires proposal information associating, for each type of area, a proposal condition and a proposed content,
      determines, for each area, whether the proposal condition is satisfied or not, based on the plurality of pieces of processing result information, the layout information, and the proposal information, and
      causes, when the proposal condition is satisfied in at least one area, a display to output, as a proposed content for the area, a proposal that is based on the proposed content associated with the proposal condition.

2. The equipment management system according to claim 1, wherein the first processing circuitry performs one or more times of processing based on the processing request, the processing request information includes processing times information indicating a number of processing times of processing requested by the processing request, at least one proposal condition indicates a lower limit of a number of times of processing per unit period, and the second processing circuitry further calculates, for each area, a total number of processing times of processing performed in the area, based on the plurality of pieces of processing result information and the layout information, wherein the second processing circuitry determines, for an area of a type that is associated with the proposal condition indicating a lower limit of the number of times, whether or not the total number of times in the area satisfies the lower limit of the number of times.

3. The equipment management system according to claim 2, wherein, when the proposal condition indicates the lower limit of the number of times, a proposed content associated with the proposal condition is reduction of equipments.

4. The equipment management system according to claim 2, further comprising:

a plurality of information processing apparatuses; and a plurality of second communication devices correspondingly and respectively installed for the information processing apparatuses, wherein each of the plurality of information processing apparatuses includes third processing circuitry that acquires the communication device identification information from the second communication device that is correspondingly installed, and issues the processing request including the communication device identification information acquired to at least one of the plurality of equipments, wherein the processing request information includes the communication device identification information of the second communication device that is installed corresponding to the information processing apparatus, wherein at least one proposal condition indicates an upper limit of the number of times of processing per unit period, wherein the second processing circuitry calculates, for each area, a total number of processing times of processing that is based on a processing request issued from the area, based on the plurality of pieces of processing result information and the layout information, and wherein the second processing circuitry determines, for an area of a type that is associated with the proposal condition indicating the upper limit of the number of times, whether or not the total number of times in the area satisfies the upper limit of the number of times.

5. The equipment management system according to claim 4, wherein, when the proposal condition indicates the upper limit of the number of times, a proposed content associated with the proposal condition is additional installation of the equipment.

6. The equipment management system according to claim 4, further comprising at least two communication devices installed corresponding to a predetermined traffic line, wherein the layout information further associates coordinate information indicating coordinates of an area indicated by the area information, at least one proposal condition indicates coordinates indicated by the coordinate information associated with the communication device identification information of each of the at least two communication devices installed corresponding to the traffic line, and the second processing circuitry determines, for an area of a type that is associated with the proposal condition indicating the two or more coordinates, whether or not processing performed in the area was performed in a mode where a straight line connecting the two or more coordinates and a straight line connecting coordinates indicated by the coordinate information associated with each of pieces of the communication device identification information included in the processing result information intersect with each other.

7. The equipment management system according to claim 6, wherein, when the proposal condition indicates the two or more coordinates, a proposed content associated with the proposal condition is a warning.

8. The equipment management system according to claim 1, wherein, the processing request information includes processing type information indicating a processing type of processing requested by the processing request, the proposal information further associates the processing type, and the second processing circuitry determines whether or not the proposal condition is satisfied, for each set of the area and the processing type.

9. The equipment management system according to claim 1, wherein the area has a hierarchical structure.

10. An equipment management device that manages a plurality of equipments, the device comprising:

processing circuitry that acquires, from each of the plurality of equipments, processing result information associating communication device identification information for identifying a communication device that is installed corresponding to the equipment and processing request information regarding a processing request;

acquires layout information associating, with each piece of the communication device identification information, area information indicating an area where the communication device indicated by the communication device identification information is installed;

acquires proposal information associating, for each type of area, a proposal condition and a proposed content;

determines, for each area, whether or not the proposal condition is satisfied, based on the plurality of pieces of processing result information, the layout information, and the proposal information; and causes, when the proposal condition is satisfied in at least one area, an output unit to output, as a proposed content for the area, a proposal that is based on the proposed content associated with the proposal condition.

* * * * *